July 19, 1966     W. F. GLOVER ETAL     3,262,079
ADJUSTABLE INDUCTOR
Filed May 27, 1964
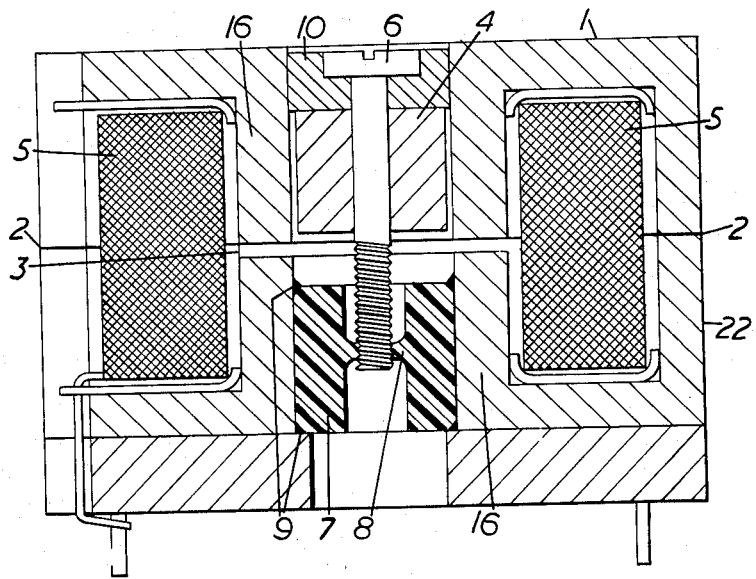
Inventors
WILLIAM F. GLOVER
JACK G. BENDALL
By
Attorney

United States Patent Office 3,262,079
Patented July 19, 1966

3,262,079
ADJUSTABLE INDUCTOR
William Frank Glover and Jack George Bendall, both of London, England, assignors to International Standard Electric Corporation, New York, N.Y., a corporation of Delaware
Filed May 27, 1964, Ser. No. 370,619
Claims priority, application Great Britain, July 5, 1963, 26,830/63
3 Claims. (Cl. 336—136)

This invention relates to adjustable inductors and in particular to means for varying the inductance thereof.

The present trend towards smaller componets introduces a number of conflicting requirements amongst which are reduced overall dimensions combined with stability of electrical parameters with time and temperature.

According to the invention there is provided an adjustable inductor including a pot core of magnetic material provided with an air-gap, a slug of magnetic material and means to adjust the position of the slug relative to the air gap, said means being mounted entirely within the bore of the core and including a threaded member attached to the slug and cooperating with a constriction in a bush which is attached to the core in such a way that any movement of the constriction in the direction of the length of the bore is substantially the same as any movement of the core adjacent to the constriction.

An embodiment of the invention will now be described with reference to the accompanying drawing showing a longitudinal section through an inductor.

The two half shells of the core form the main body of the inductor and are indicated by 1 and 22. They may be of any suitable magnetic material, for example ferrite. These half-cores abut along the faces 2, and are fixed relative to each other, for example by means of adhesive or cement and enclose within a cavity the winding 5 of the inductor. An air gap 3 is provided between the central bosses 16 of the half cores and determines the minimum inductance of the coil.

Slug 4 is attached to screw 6 by cement. The lower threaded part of this screw engages a bush 7 of plastic material. The central part of this bush, midway between its upper and lower faces, is provided with a constriction 8 in which a thread is formed by the screw. The bush is secured to the lower core 22 for instance by fillets of cement or adhesive 9. The friction between the screw thread and the bush prevents any unwanted axial movement of the slug 4. Radial play of the slug is prevented by a plastic washer 10 placed between the head of the screw 6 and the slug 4.

The value of the inductance is adjusted by altering the position of a slug 4 also of magnetic material relative to the air gap 3. Means to achieve this should if possible not increase the overall dimensions of the inductor, i.e. should be accommodated entirely within the core, once adjusted should not alter its setting and should not adversely influence the variation of inductance with temperature. The following arrangement has been found satisfactory.

The movable slug 4 is cemented to a screw 6 of nonmagnetic material. Between the head of the screw and the slug 4 a washer 10 of resilient material is trapped and prevents any radial play of the slug in the bore of the core. Washer 10 also provides sufficient friction against the core to prevent the screw from changing its setting as a result of vibration or other causes. The lower threaded part of the screw cooperates with a bush 7 made for example of thermoplastic material. The upper and lower edges are secured to the core by means of fillets 9 of suitable adhesive. To avoid axial play of the screw and therefore of the slug 4, the bush 7 is designed to act as a self tapping nut. It has been found, however, that if the screw 6 has to "cut" a thread along the whole length of the bush, excessive torque is required thus breaking fillets 9 of adhesive. If the thread was formed either in the upper or lower half of the bush, the other half of the bush being provided with a clearance hole, it was observed that the temperature coefficient of inductance was altered. This is due to the relatively large temperature coefficient of volumetric expansion of the material of the bush relative to that of the core. As a result the bush bulges in the direction along its axis and displaces the screw 6 and the plunger 4 when temperature varies. When the thread was formed in the upper part of the bush the temperature coefficient of inductance was reduced. Conversely when the thread was formed in the lower part of the bush the temperature coefficient increased. To overcome these effects the constriction in the bush was restricted to a plane halfway along the bush as shown at 8 which plane is not displaced axially when the material of the bush expands or contracts. To simplify assembly the part of the bush above the constriction may be provided with a "lead-in" preformed thread to guide the screw 6 into the constriction 8. These threads are however sufficiently loose not to influence the location of the screw by the threads formed in the constriction.

An important feature of the above arrangement is that the whole adjusting mechanism is accommodated within the confines of the core assembly and has no protruding parts.

It is to be understood that the following description of specific examples of this invention is not to be considered as a limitation on its scope.

What we claim is:
1. An adjustable conductor comprising two half cores of magnetic material fixed relative to each other, forming therebetween an air gap, each half core having central bores;
   a slug of magnetic material positioned within the central bore of one of said half cores and adapted to move within said bores;
   a bush of plastic material positioned within the central bore of the other of said half core, said bush having an axial bore therethrough and a portion intermediate the ends of said axial bore to present a constriction thereat; and
   means carried by said slug and cooperating with said constriction for axially adjusting the position of said slug relative to the air gap.
2. An adjustable inductor, according to claim 1, wherein:
   said adjusting means include a threaded member fixed in said slug and extending therefrom and into said constriction, said constriction holding said threaded member therein against undesired axial movement.
3. An adjustable inductor, according to claim 1, wherein:
   the inner surface of said constriction is untapped and the inner diameter of said constriction is smaller than the diameter of said threaded member.

References Cited by the Examiner

FOREIGN PATENTS
245,097   5/1963   Australia.

ROBERT K. SCHAEFER, *Primary Examiner.*
C. A. TORRES, *Assistant Examiner.*